(12) United States Patent
Kamada

(10) Patent No.: US 12,516,782 B2
(45) Date of Patent: Jan. 6, 2026

(54) FLOODING DETECTION DEVICE, FLOODING DETECTION SYSTEM, AND FLOODING DETECTION METHOD

(71) Applicant: NEC Corporation, Tokyo (JP)

(72) Inventor: Shinya Kamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 196 days.

(21) Appl. No.: 18/281,690

(22) PCT Filed: Mar. 19, 2021

(86) PCT No.: PCT/JP2021/011420
§ 371 (c)(1),
(2) Date: Sep. 12, 2023

(87) PCT Pub. No.: WO2022/195856
PCT Pub. Date: Sep. 22, 2022

(65) Prior Publication Data
US 2024/0151367 A1 May 9, 2024

(51) Int. Cl.
*F17D 5/06* (2006.01)
(52) U.S. Cl.
CPC .................... *F17D 5/06* (2013.01)
(58) Field of Classification Search
CPC . F17D 5/06; G01H 9/00; G01H 9/004; G01N 29/06; G01N 29/043; G01N 29/069; G02B 6/00; G01L 9/00
See application file for complete search history.

(56) References Cited

U.S. PATENT DOCUMENTS

| | | | |
|---|---|---|---|
| 5,673,341 A * | 9/1997 | Takesue | G02B 6/032 385/12 |
| 2011/0311179 A1* | 12/2011 | Greenaway | G01D 5/3539 73/705 |
| 2013/0298635 A1 | 11/2013 | Godfrey | |
| 2013/0333474 A1 | 12/2013 | Godfrey et al. | |
| 2018/0058208 A1* | 3/2018 | Song | E21B 47/16 |

FOREIGN PATENT DOCUMENTS

| | | |
|---|---|---|
| CN | 102997059 A | 3/2013 |
| JP | H04-348274 A | 12/1992 |
| JP | H11-132896 A | 5/1999 |

(Continued)

OTHER PUBLICATIONS

International Search Report for PCT Application No. PCT/JP2021/011420, mailed on Jun. 1, 2021.

(Continued)

*Primary Examiner* — Georgia Y Epps
*Assistant Examiner* — Don J Williams
(74) *Attorney, Agent, or Firm* — Sughrue Mion, PLLC

(57) ABSTRACT

Provided is a flooding detection device or the like capable of detecting flooding in a pipeline. The flooding detection device comprises: an optical signal reception unit configured to receive an optical signal, including sensing information, from an optical fiber provided along the pipeline; at least one memory configured to store instructions; and at least one processor configured to execute the instructions to detect the propagation characteristics of vibrations in the pipeline using the sensing information included in the optical signal and detect flooding in the pipeline on the basis of the propagation characteristics.

12 Claims, 11 Drawing Sheets

(56) References Cited

FOREIGN PATENT DOCUMENTS

| | | |
|---|---|---|
| JP | 2003-322582 A | 11/2003 |
| JP | 2010-261746 A | 11/2010 |
| JP | 2018-109649 A1 | 7/2018 |
| WO | 2019/087355 A1 | 5/2019 |

OTHER PUBLICATIONS

English translation of Written opinion for PCT Application No. PCT/JP2021/011420, mailed on Jun. 1, 2021.

* cited by examiner

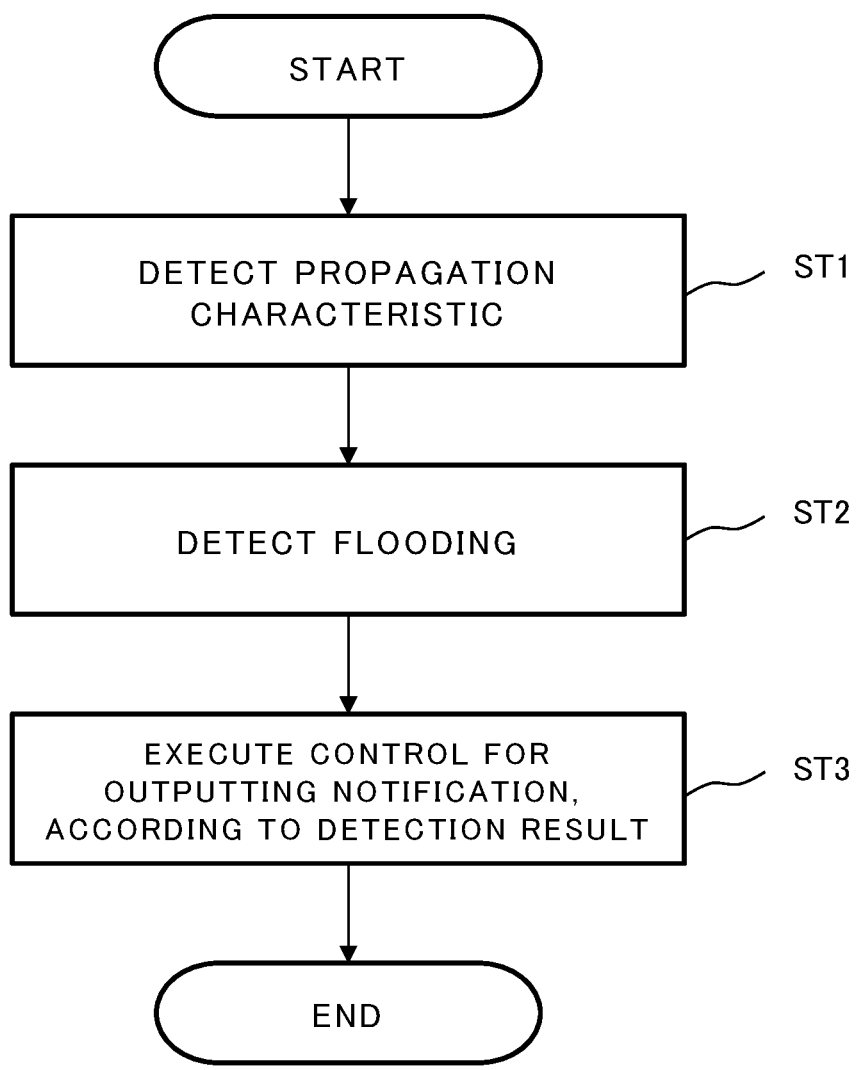

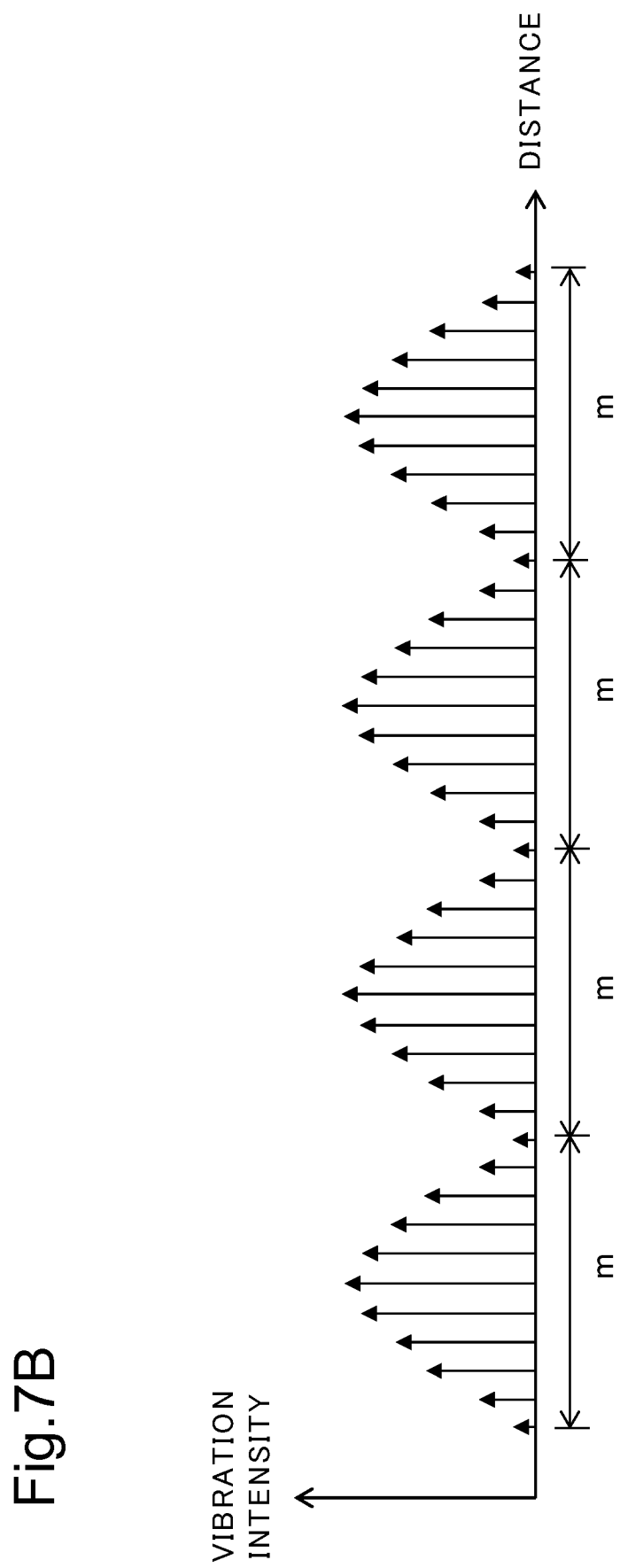

POINT P1 (DISTANCE D1),
TIME POINT T1

POINT P2 (DISTANCE D2),
TIME POINT T2

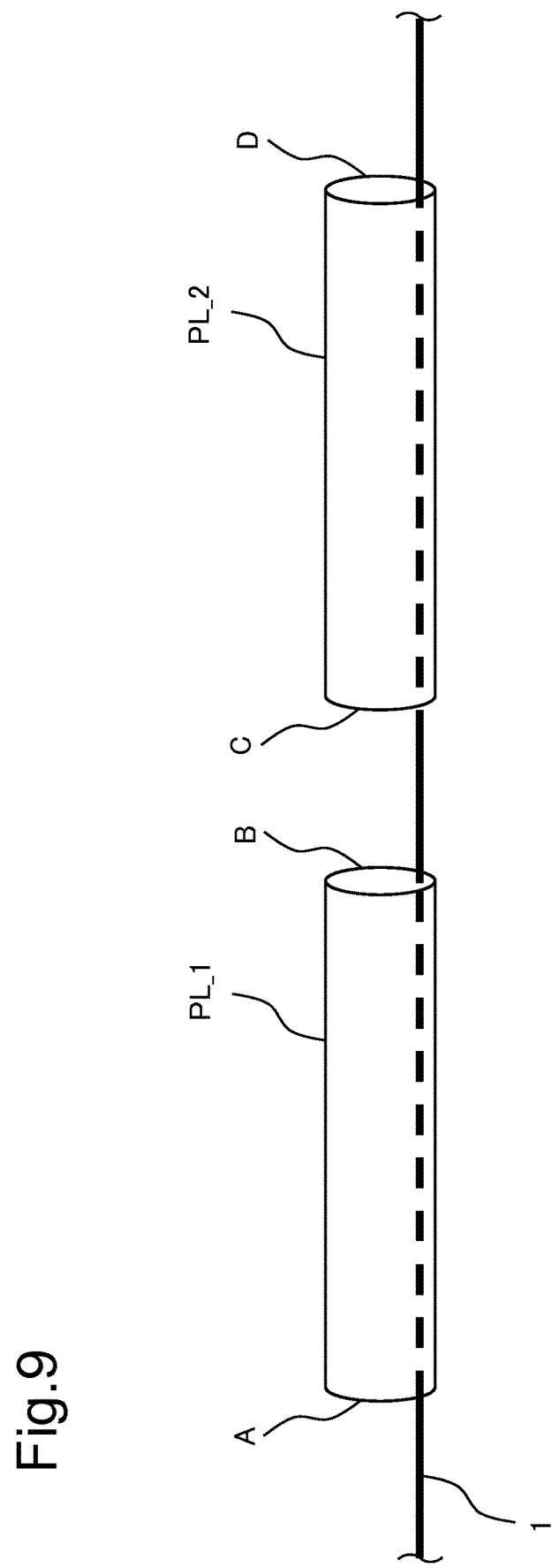

FLOODING DETECTION DEVICE, FLOODING DETECTION SYSTEM, AND FLOODING DETECTION METHOD

This application is a National Stage Entry of PCT/JP2021/011420 filed on Mar. 19, 2021, the contents of all of which are incorporated herein by reference, in their entirety.

TECHNICAL FIELD

The present disclosure relates to a flooding detection device and the like.

BACKGROUND ART

PTL 1 discloses a technique for detecting deterioration (for example, thinning or corrosion) of a pipe. In the technique described in PTL 1, a plurality of ultrasonic optical probes are attached to an outer surface of a pipe. A wall thickness of the pipe is measured by using the ultrasonic optical probes. By measuring the wall thickness, thinning, corrosion, or the like is detected (see paragraphs to [0016], paragraphs [0032] to [0042], paragraph [212], and the like of PTL 1).

As a related art, a technique described in PTL 2 is also known.

CITATION LIST

Patent Literature

PTL 1: Japanese Unexamined Patent Application Publication No. 2018-109649
PTL 2: Japanese Unexamined Patent Application Publication No. 2010-261746

SUMMARY OF INVENTION

Technical Problem

A technique for detecting flooding in a pipeline (for example, a pipeline laid underground) is desired. Herein, the technique described in PTL 1 detects deterioration (for example, thinning or corrosion) of a pipe, based on a wall thickness of the pipe, and does not detect flooding in the pipe. Therefore, there is a problem that it is not possible to detect flooding in the pipeline by using the technique described in PTL 1 and therefore it is not possible to prevent corrosion and the like of the pipe due to flooding in advance.

The present disclosure has been made in order to solve the above-described problem, and an object thereof is to provide a flooding detection device and the like capable of detecting flooding in a pipeline.

Solution to Problem

A flooding detection device according to one aspect of the present disclosure includes: an optical signal reception means for receiving an optical signal including sensing information, from an optical fiber provided along a pipeline; a propagation characteristic detection means for detecting a propagation characteristic of vibration in the pipeline by using the sensing information included in the optical signal; and a flooding detection means for detecting flooding in the pipeline, based on the propagation characteristic.

A flooding detection system according to one aspect of the present disclosure includes: an optical signal reception means for receiving an optical signal including sensing information, from an optical fiber provided along a pipeline; a propagation characteristic detection means for detecting a propagation characteristic of vibration in the pipeline by using the sensing information included in the optical signal; and a flooding detection means for detecting flooding in the pipeline, based on the propagation characteristic.

A flooding detection method according to one aspect of the present disclosure includes: receiving, by an optical signal reception means, an optical signal including sensing information, from an optical fiber provided along a pipeline; detecting, by a propagation characteristic detection means, a propagation characteristic of vibration in the pipeline by using the sensing information included in the optical signal; and detecting, by a flooding detection means, flooding in the pipeline, based on the propagation characteristic.

Advantageous Effects of Invention

According to the present disclosure, it is possible to detect flooding in a pipeline.

BRIEF DESCRIPTION OF DRAWINGS

FIG. 6 is a flowchart illustrating an operation of the flooding detection device according to the first example embodiment.

FIG. 7B is an explanatory diagram illustrating an example of an intensity distribution of vibration associated to a fourth-order standing wave among the standing waves illustrated in FIG. 7A.

FIG. 9 is an explanatory diagram illustrating another example of a state in which an optical fiber is provided along a pipeline.

EXAMPLE EMBODIMENT

Hereinafter, an example embodiment of the present disclosure will be described in detail with reference to the accompanying drawings.

First Example Embodiment

Figure 1:
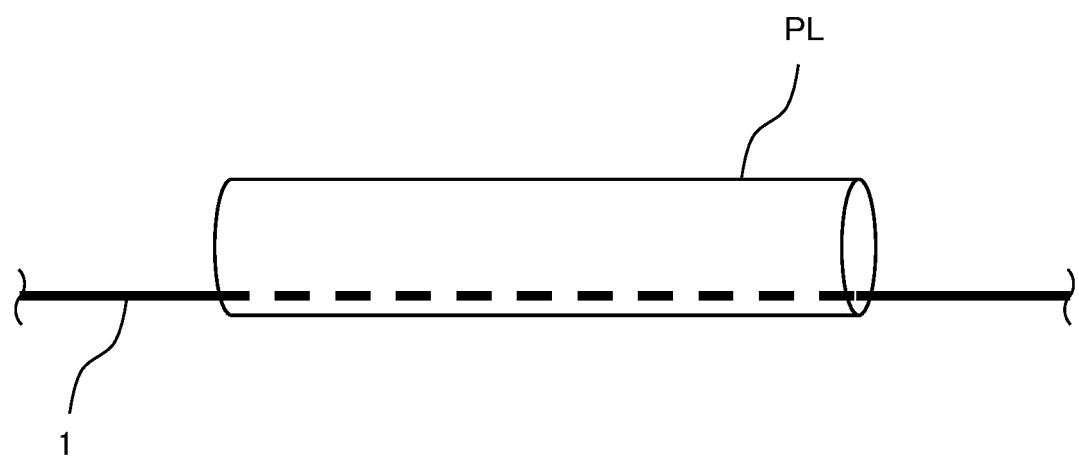
FIG. 1 is an explanatory diagram illustrating an example of a state in which an optical fiber is provided along a pipeline.
Figure 2:
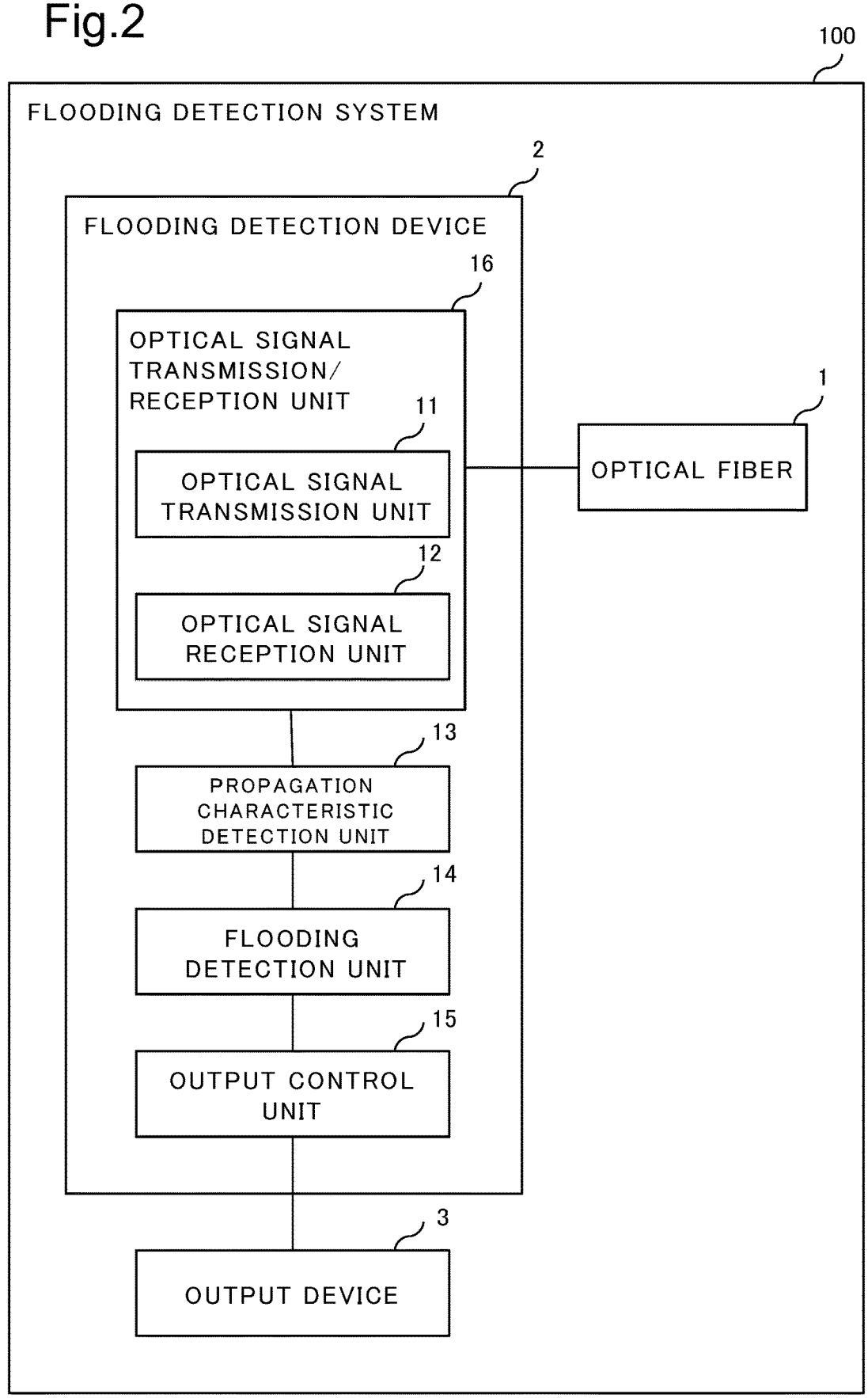
FIG. 2 is a block diagram illustrating a main part of a flooding detection system according to a first example embodiment.

FIG. 1 is an explanatory diagram illustrating an example of a state in which an optical fiber is provided along a pipeline. FIG. 2 is a block diagram illustrating a main part of a flooding detection system according to a first example embodiment. The flooding detection system according to the first example embodiment will be described with reference to FIGS. 1 and 2.

As illustrated in FIG. 1, an optical fiber 1 is provided along a pipeline PL. The pipeline PL is a pipeline that is possibly flooded (for example, a pipeline laid in underground). The optical fiber 1 is, for example, an existing optical fiber for communication. In the example illustrated in FIG. 1, the optical fiber 1 is provided inside the pipeline PL and is linearly provided along a longitudinal direction of the pipeline PL. In the example illustrated in FIG. 1, the pipeline PL is provided in a lateral direction, and the optical fiber 1 is disposed lower side in an interior of the pipeline PL.

Herein, the optical fiber 1 can be used for optical fiber sensing. Specifically, for example, the optical fiber 1 can be used to detect vibration, sound, or temperature by distributed fiber optic sensing (DFOS). Hereinafter, information detected by the optical fiber 1 using optical fiber sensing may be collectively referred to as "sensing information". In other words, the optical fiber 1 detects the sensing information.

As illustrated in FIG. 2, a flooding detection system 100 includes the optical fiber 1, a flooding detection device 2, and an output device 3. The flooding detection device 2 includes an optical signal transmission unit 11, an optical signal reception unit 12, a propagation characteristic detection unit 13, a flooding detection unit 14, and an output control unit 15. The optical signal transmission unit 11 and the optical signal reception unit 12 constitute a main part of the optical signal transmission/reception unit 16.

The optical signal transmission unit 11 outputs an optical signal to the optical fiber 1. The output optical signal is input to the optical fiber 1 and propagates inside the optical fiber 1. At this time, backscattered light is generated inside the optical fiber 1. The optical signal reception unit 12 receives an optical signal associated to the generated backscattered light. The received optical signal includes sensing information for DFOS.

The optical signal transmission/reception unit 16 may include a device (not illustrated) for separating the optical signal output by the optical signal transmission unit 11 and the optical signal received by the optical signal reception unit 12. For example, the optical signal transmission/reception unit 16 may include an optical circulator (not illustrated) provided between the optical signal transmission unit 11 and the optical fiber 1, and the optical signal reception unit 12.

The propagation characteristic detection unit 13 detects a propagation characteristic of vibration inside the pipeline PL by using the sensing information included in the optical signal received by the optical signal reception unit 12. The flooding detection unit 14 detects flooding in the pipeline PL, based on the detected propagation characteristic. Specifically, for example, the flooding detection unit 14 detects whether flooding has occurred in the pipeline PL. Alternatively, for example, the flooding detection unit 14 detects whether flooding has occurred in the pipeline PL and also detects a section of the pipeline PL where the flooding occurs. Herein, "flooding" that is a target of detection by the flooding detection unit 14 refers to a state in which water is accumulated in at least some sections of the pipeline PL to an extent that at least the optical fiber 1 is completely submerged due to flooding.

A specific example of the propagation characteristic detected by the propagation characteristic detection unit 13, a specific example of a method for detecting a propagation characteristic by the propagation characteristic detection unit 13, and a specific example of a method for detecting flooding by the flooding detection unit 14 will be described later with reference to FIGS. 7A, 7B, 8A, and 8B.

The output control unit 15 executes control for outputting a notification according to a result of detection (hereinafter, sometimes simply referred to as "detection result") by the flooding detection unit 14. The output device 3 is used to output the notification. The output device 3 includes, for example, at least one of a display device, an audio output device, and a communication device. The display device is, for example, a display device using a display. The audio output device is, for example, an audio output device using a speaker. The communication device is, for example, a communication device using a dedicated transmitter and a dedicated receiver.

Specifically, for example, the output control unit 15 executes control for displaying an image for the notification. The display device of the output device 3 is used to display the image. Alternatively, for example, the output control unit 15 executes control for outputting sound for the notification. The audio output device of the output device 3 is used to output the audio. Alternatively, for example, the output control unit 15 executes control for transmitting a signal for the notification to another system (not illustrated). The communication device of the output device 3 is used to transmit the signal.

Specifically, for example, when the detection result indicates that flooding occurs in the pipeline PL, a notification indicating that the flooding has occurred in the pipeline PL is output. Further, when the detection result indicates a section of the pipeline PL where the flooding occurs, a notification indicating the section may be output. Further, different notifications may be output according to a size of the section.

In this way, the main part of the flooding detection system 100 is configured.

Hereinafter, the optical signal transmission unit 11 may be referred to as an "optical signal transmission unit". Further, the optical signal reception unit 12 may be referred to as an "optical signal reception means". Further, the propagation characteristic detection unit 13 may be referred to as a "propagation characteristic detection means". Further, the flooding detection unit 14 may be referred to as a "flooding detection means". Further, the output control unit 15 may be referred to as an "output control means".

Next, with reference to FIGS. 3 to 5, a hardware configuration of a main part of the flooding detection device 2 will be described.

Figure 3:
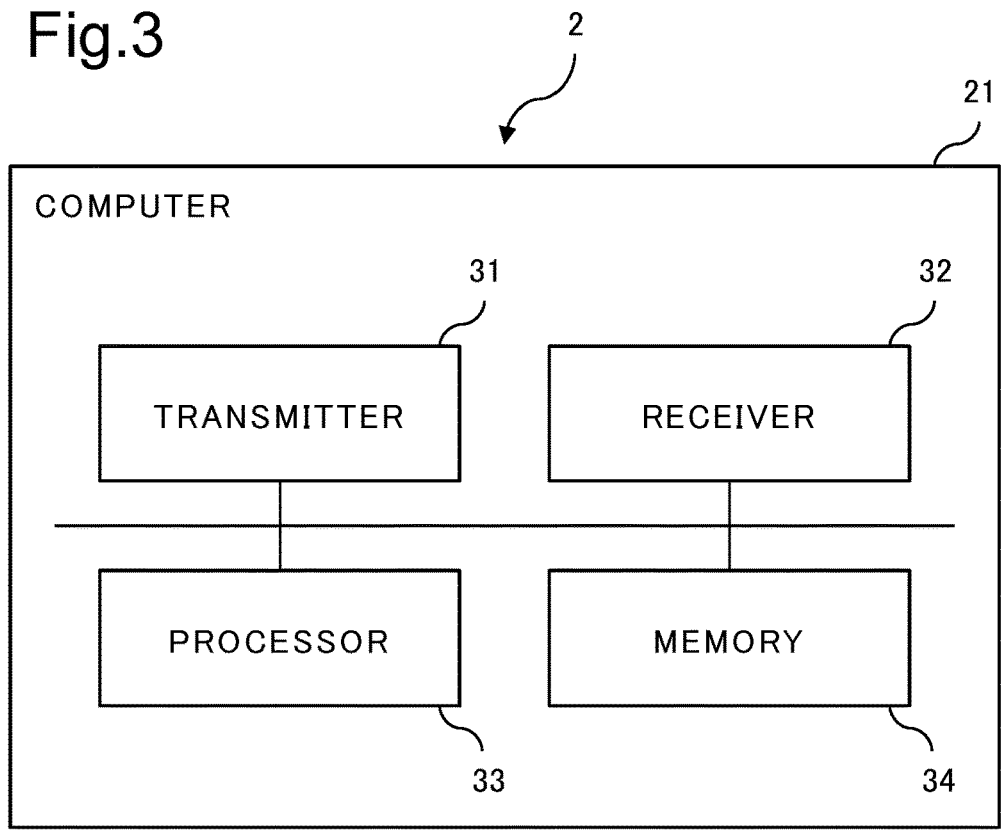
FIG. 3 is a block diagram illustrating a hardware configuration of a main part of a flooding detection device according to the first example embodiment.
Figure 4:
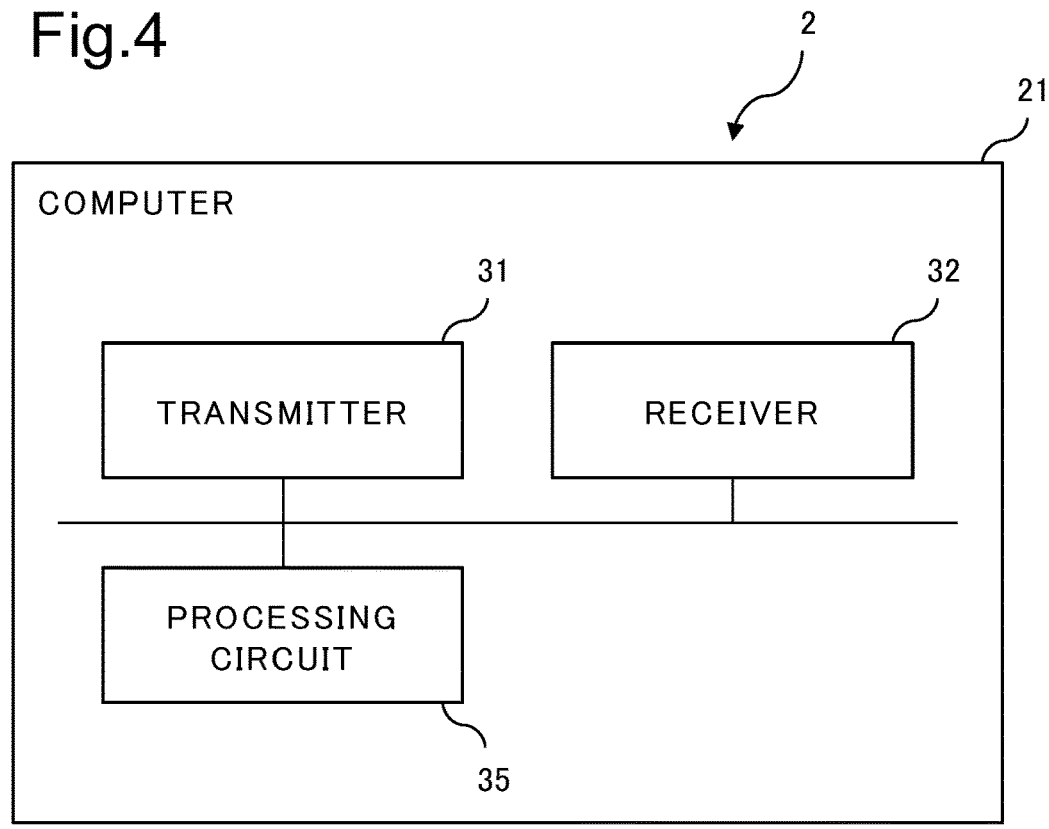
FIG. 4 is a block diagram illustrating another hardware configuration of a main part of the flooding detection device according to the first example embodiment.
Figure 5:
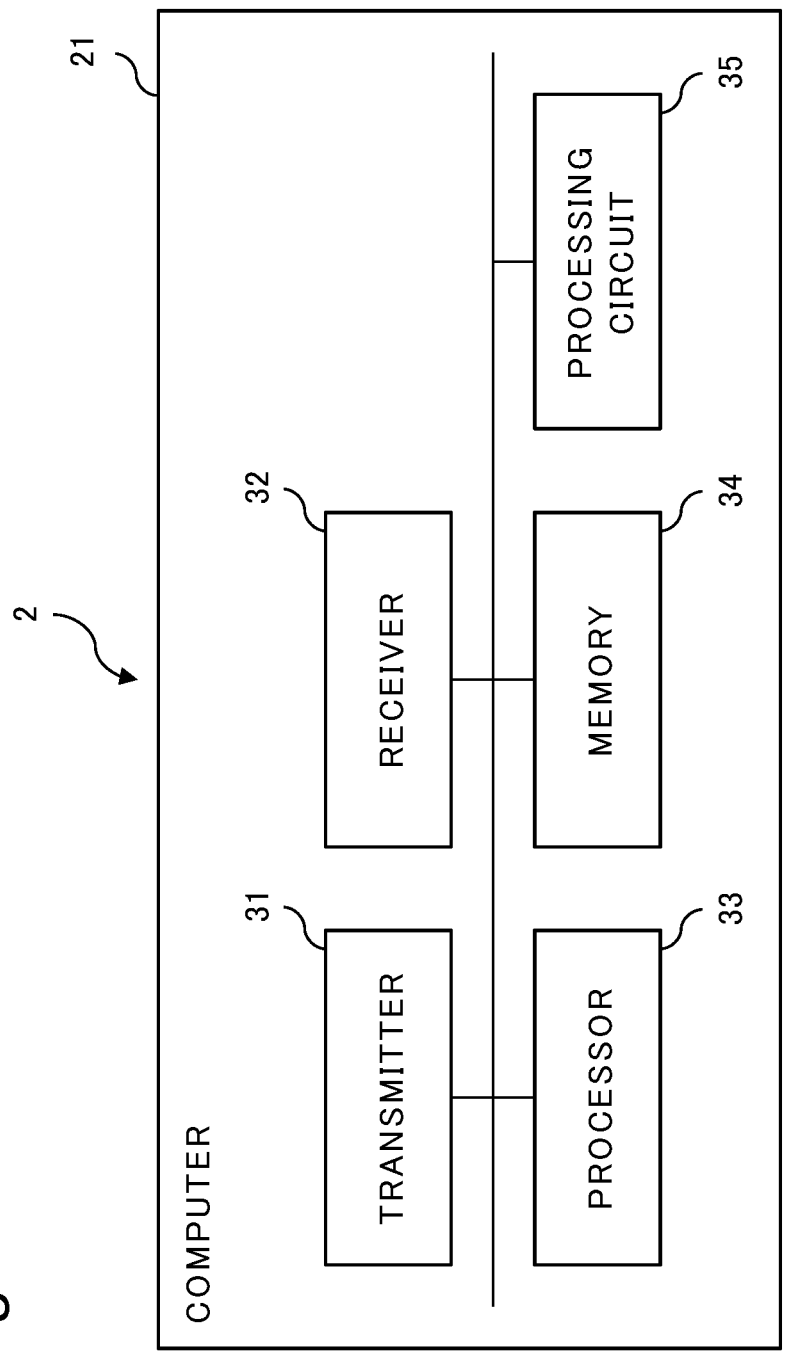
FIG. 5 is a block diagram illustrating another hardware configuration of a main part of the flooding detection device according to the first example embodiment.

As illustrated in FIGS. 3 to 5, the flooding detection device 2 is a flooding detection device using a computer 21.

As illustrated in FIG. 3, the computer 21 includes a transmitter 31, a receiver 32, a processor 33, and a memory 34. The memory 34 stores a program (including a program for causing the transmitter 31 to function as the optical signal transmission unit 11 and a program for causing the receiver 32 to function as the optical signal reception unit 12) for causing the computer 21 to function as the optical signal transmission unit 11, the optical signal reception unit 12, the propagation characteristic detection unit 13, the flooding detection unit 14, and the output control unit 15. The processor 33 reads and executes the program stored in the memory 34. Thus, a function F1 of the optical signal transmission unit 11, a function F2 of the optical signal reception unit 12, a function F3 of the propagation characteristic detection unit 13, a function F4 of the flooding detection unit 14, and a function F5 of the output control unit 15 are achieved.

Alternatively, as illustrated in FIG. 4, the computer 21 includes the transmitter 31, the receiver 32, and a processing circuit 35. The processing circuit 35 executes processing (including processing for causing the transmitter 31 to function as the optical signal transmission unit 11 and processing for causing the receiver 32 to function as the optical signal reception unit 12) for causing the computer 21 to function as the optical signal transmission unit 11, the optical signal reception unit 12, the propagation characteristic detection unit 13, the flooding detection unit 14, and the output control unit 15. Thus, the functions F1 to F5 are achieved.

Alternatively, as illustrated in FIG. 5, the computer 21 includes the transmitter 31, the receiver 32, the processor 33, the memory 34, and the processing circuit 35. In this case, some of the functions F1 to F5 are achieved by the processor 33 and the memory 34, and remaining functions of the functions F1 to F5 are achieved by the processing circuit 35.

The processor 33 is constituted of one or more processors. Each of the processors is, for example, a processor using a central processing unit (CPU), a graphics processing unit (GPU), a microprocessor, a microcontroller, or a digital signal processor (DSP).

The memory 34 is constituted of one or more memories. Each of the memories is, for example, a memory using a random access memory (RAM), a read only memory (ROM), a flash memory, an erasable programmable read only memory (EPROM), an electrically erasable programmable read only memory (EEPROM), a solid state drive, a hard disk drive, a flexible disk, a compact disk, a digital versatile disc (DVD), a Blu-ray disk, a magneto optical (MO) disk, or a mini disk.

The processing circuit 35 is constituted of one or more processing circuits. Each of the processing circuits is, for example, a processing circuit using an application specific integrated circuit (ASIC), a programmable logic device (PLD), a field programmable gate array (FPGA), a system on a chip (SoCs), or a system large scale integration s(LSI).

The processor 33 may include a dedicated processor associated to each of the functions F1 to F5. The memory 34 may include a dedicated memory associated to each of the functions F1 to F5. The processing circuit 35 may include a dedicated processing circuit associated to each of the functions F1 to F5.

Next, with reference to a flowchart illustrated in FIG. 6, an operation of the flooding detection device 2 will be described, mainly on operations of the propagation characteristic detection unit 13, the flooding detection unit 14, and the output control unit 15.

First, the propagation characteristic detection unit 13 detects a propagation characteristic of vibration inside the pipeline PL (step ST1). Sensing information included in an optical signal received by the optical signal reception unit 12 is used for detecting the propagation characteristic in step ST1.

Next, the flooding detection unit 14 detects flooding in the pipeline PL (step ST2). More specifically, the flooding detection unit 14 detects whether flooding has occurred in the pipeline PL. Alternatively, the flooding detection unit 14 detects whether flooding has occurred in the pipeline PL and detects a section of the pipeline PL where the flooding occurs. The detection of flooding in step ST2 is based on the propagation characteristic detected in step ST1.

Next, the output control unit 15 executes control for outputting a notification according to a result of the detection in step ST2 (step ST3).

Next, with reference to FIGS. 7A, 7B, 8A, and 8B, a specific example of the propagation characteristic detected by the propagation characteristic detection unit 13, a specific example of a method for detecting a propagation characteristic by the propagation characteristic detection unit 13, and a specific example of a method for detecting flooding by the flooding detection unit 14 will be described.

First, a first specific example will be described with reference to FIGS. 7A and 7B. In a first example embodiment, whether flooding has occurred in the pipeline PL is detected.

It is assumed that a sound is generated inside the pipeline PL due to some factor. Alternatively, it is assumed that a sound generated outside the pipeline PL enters the inside of the pipeline PL due to some factor. In such cases, the sound propagates inside the pipeline PL. Normally, the sound propagating inside the pipeline PL is hardly attenuated. Therefore, a state in which identical sounds or associated sounds propagate bidirectionally inside the pipeline PL may occur. Specifically, for example, at least one end of the pipeline PL is connected with a manhole space or a handhole space. In this case, since the end is an open end where a spatial cross-sectional area changes, the end may function as an entry point of sound and may also function as a reflection point of sound. Alternatively, for example, a wall or a lid is provided at the end. In this case, since the end is a closed end, the end may function as a reflection point of sound.

A standing wave is generated by the identical sounds or associated sounds bidirectionally propagating inside the pipeline PL. When only one end of the line PL is a reflection point of sound, such standing wave is generated regardless of the frequency of the sound. In other words, the standing wave is generated regardless of a relationship between a wavelength of the sound and a length L of the pipeline PL, and is generated for each frequency component included in the sound. Meanwhile, when both ends of the pipeline PL are reflection points of sound, the standing wave is generated for a frequency component associated to a so-called "natural frequency". The natural frequency is determined according to the length L of the pipeline PL, and is different depending on a medium in which the sound propagates (for example, air or water in the pipeline PL). This is because, from a viewpoint of a soundwave, the length L appears to have changed equivalently, depending on the medium in which the sound propagates. Herein, standing wave associated to a frequency component associated to a wavelength smaller than the length L has a plurality of antinodes and a plurality of nodes.

Figure 7A:
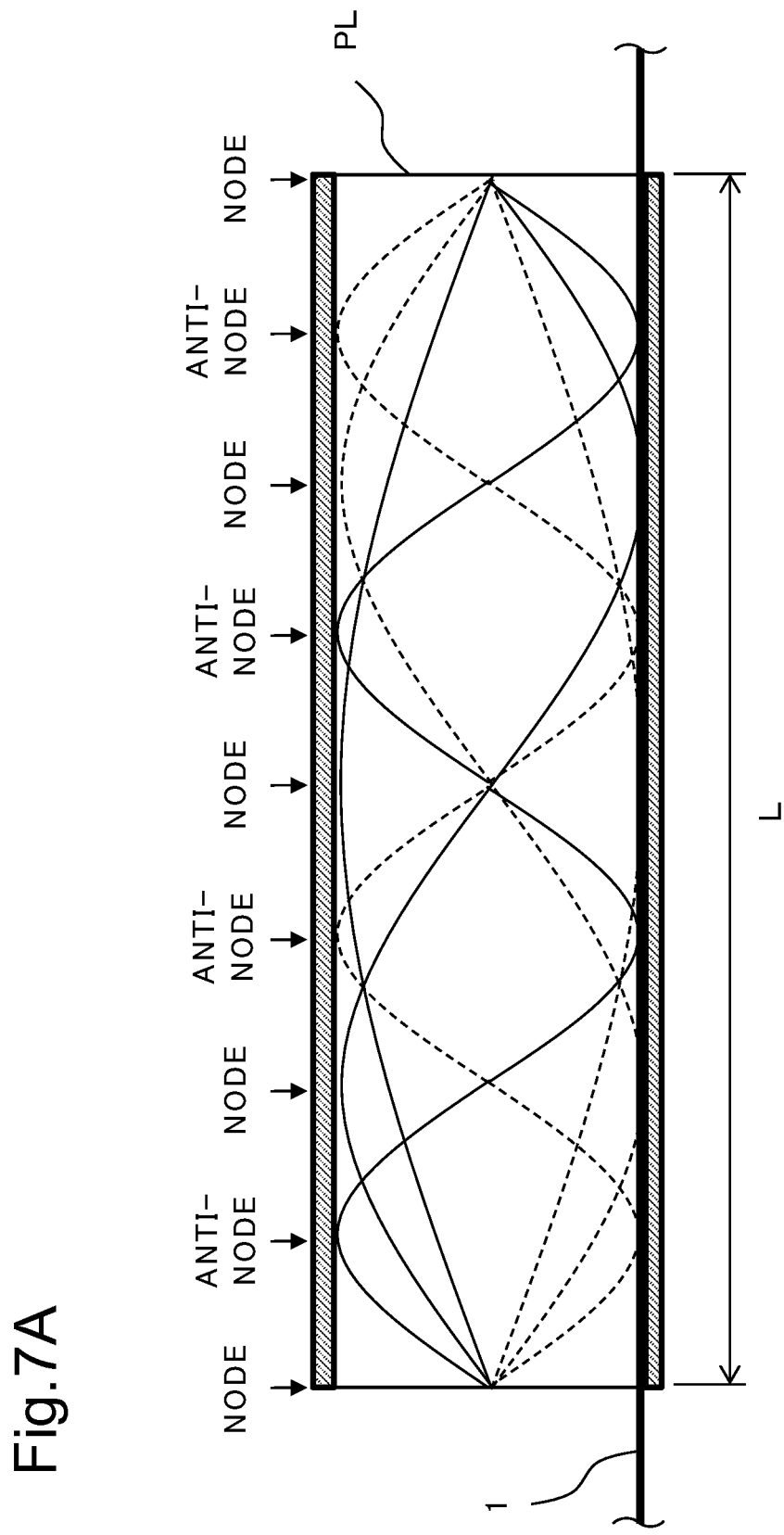
FIG. 7A is an explanatory diagram illustrating an example of a standing wave generated in a pipeline.

FIG. 7A illustrates an example of a standing wave inside the pipeline PL. In the example illustrated in FIG. 7A, both ends of the pipeline PL are reflection points of sound, and the standing wave is generated for the frequency component associated to the natural frequency. More specifically, the sound propagating bidirectionally in the pipeline PL includes a frequency component associated to a wavelength twice as long as the length L, a frequency component associated to a wavelength equivalent to the length L, and a frequency component associated to a wavelength half as long as the length L. Therefore, a standing wave (specifically, a first-order standing wave) associated to the frequency component associated to the wavelength twice as long as the length L is generated. In addition, a standing wave (specifically, a second-order standing wave) associated to the frequency component associated to the wavelength equivalent to the length L is also generated. Furthermore, a standing wave (specifically, a fourth-order standing wave) associated to the frequency component associated to the wavelength half as long as the length L is also generated. Each of the second-order standing wave and the fourth-order standing wave corresponds to a wavelength smaller than the length L. Thus, each of the second-order standing wave and the fourth-order standing wave has a plurality of antinodes and a plurality of nodes. FIG. 7A illustrates a position of each of the antinodes of the fourth-order standing wave in a longitudinal direction of the pipeline PL and a position of each of the nodes of the fourth-order standing wave in the longitudinal direction of the pipeline PL. In FIG. 7A, each of the standing waves is illustrated as a transverse wave.

Note that, at each end of the pipeline PL, an antinode of a standing wave is generated when the end portion is an open end, and a node of a standing wave is generated when the end portion is a closed end. In the example illustrated in FIG. 7A, nodes of a standing wave is generated at both ends of the pipeline PL. Such standing wave is generated when both ends of the pipeline PL are closed (for example, as described above, when walls or lids are provided). In FIG. 7A, members that close both ends of the pipeline PL are not illustrated.

Herein, a physical quantity detected by the optical fiber 1 includes vibration of air or water due to the sound propagating inside the pipe line PL (specifically, vibration of air or water due to the standing waves). The sensing information includes information indicating an intensity distribution of the vibration, and the intensity distribution is an intensity distribution for each frequency component with respect to a distance (hereinafter, sometimes referred to as a "frequency intensity distribution"). The "distance" is a distance from the optical signal reception unit 12 in the optical fiber 1. FIG. 7B illustrates an example of the intensity distribution of the vibration with respect to the distance for the frequency component associated to the fourth-order standing wave illustrated in FIG. 7A. As illustrated in FIG. 7B, intensity of the vibration at a distance associated to each antinode is greater than intensities of the vibration at other distances. Further, intensity of the vibration at a distance associated to each node is smaller than intensity of the vibration at other distances. This is a common characteristic for standing waves associated to any frequency component. In other words, for a specific frequency f, the characteristic of intensity distribution appears when a standing wave is generated in the pipeline PL.

The propagation characteristic detection unit 13 selects the frequency f at which the characteristic of intensity distribution appears. On a basis of the characteristic of intensity distribution, the propagation characteristic detection unit 13 calculates an interval m between adjacent antinodes in a standing wave associated to the selected frequency f, or an interval m between adjacent nodes in the standing wave associated to the selected frequency f. In FIG. 7B, a distance m between adjacent nodes in the fourth-order standing wave illustrated in FIG. 7A is illustrated. The propagation characteristic detection unit 13 uses the calculated interval m to calculate a wavelength λ of the standing wave associated to the selected frequency f by using the following Math (1).

$$\lambda = m \times 2 \quad (1)$$

The propagation characteristic detection unit 13 calculates a sound velocity v inside the pipeline PL by using the selected frequency f and the calculated wavelength λ. Specifically, for example, the propagation characteristic detection unit 13 calculates the sound velocity v by using the following Math (2). Specifically, the sound velocity v corresponds to a propagation speed of the vibration inside the pipeline PL. In other words, the propagation characteristic detection unit 13 detects the propagation speed of the vibration as the propagation characteristic of the vibration inside the pipeline PL.

$$v = f \times \lambda \quad (2)$$

Normally, sound velocity may vary greatly, depending on a medium. For example, sound velocity in air is approximately four times faster than sound velocity in water. As an example, when an environmental temperature is 20 degrees, the sound velocity in air is 345 meters per second, while the sound velocity in water is 1479 meters per second.

Therefore, the flooding detection unit 14 determines whether the sound velocity v calculated by the propagation characteristic detection unit 13 is a value associated to the sound velocity in air or a value associated to the sound velocity in water. When the sound velocity v is a value associated to the sound velocity in air, the flooding detection unit 14 determines that flooding in the pipeline PL has not occurred. Meanwhile, when the sound velocity v is a value associated to the sound velocity in water, the flooding detection unit 14 determines that flooding in the pipeline PL has occurred. In this way, whether flooding in the pipeline PL has occurred is detected.

Note that the determination by the flooding detection unit 14 may be performed using a model for determination. For example, the following model is prepared in advance for each assumed environmental temperature in the pipeline PL. Specifically, a model is prepared in advance and the model outputs, when the value of the sound velocity v is input, information indicating whether the input value is a value associated to the sound velocity in air or a value associated to the sound velocity in water. The model is generated by machine learning, for example. The flooding detection unit 14 inputs the calculated sound velocity v to the model. Thereby, information indicating whether the calculated sound velocity v is a value associated to the sound velocity in air or a value associated to the sound velocity in water is output. In this way, it is determined whether the calculated sound velocity v is a value associated to the sound velocity in air or a value associated to the sound velocity in water.

Further, the determination by the flooding detection unit 14 may be performed by using a threshold value for determination. For example, a threshold value by which the sound velocity in air and the sound velocity in water can be distinguished from each other is set in advance for each assumed environmental temperature in the pipeline PL. The flooding detection unit 14 compares the calculated sound velocity v with the set threshold value to determine whether the calculated sound velocity v is a value associated to the sound velocity in air or a value associated to the sound velocity in water. At this occasion, from a viewpoint of detecting an occurrence of flooding with high accuracy, the threshold value may be set to a value close to the sound velocity in water.

The propagation characteristic detection unit 13 and the flooding detection unit 14 may use standing waves associated to a plurality of different frequency components. In other words, the propagation characteristic detection unit 13 and the flooding detection unit 14 may use a plurality of frequencies f associated to the standing waves. That is, the propagation characteristic detection unit 13 calculates a sound velocity v for each of the plurality of frequencies f. As a result, a plurality of sound velocities v associated to the plurality of frequencies f are calculated.

Next, the flooding detection unit 14 calculates a statistical value (more specifically, an average value), based on the plurality of calculated sound velocities v. The flooding detection unit 14 determines whether the statistical value is a value associated to the sound velocity in air or a value associated to the sound velocity in water. When the statistical value is a value associated to the sound velocity in air, the flooding detection unit 14 determines that flooding in the pipeline PL has not occurred. On the other hand, when the statistical value is a value associated to the sound velocity in water, the flooding detection unit 14 determines that the flooding in the pipeline PL has occurred.

Alternatively, the flooding detection unit 14 determines whether each of the plurality of calculated sound velocities v is a value associated to the sound velocity in air or a value associated to the sound velocity in water. When a predetermined number (for example, one) or more of the sound velocities v are values associated to the sound velocity in water, the flooding detection unit 14 determines that flooding has occurred. Otherwise, the flooding detection unit 14 determines that flooding has not occur.

As described above, by using the plurality of frequencies f, it is possible to improve accuracy in detecting whether flooding has occurred, as compared with a case where only one frequency f is used.

Depending on an amount of water entering the pipeline PL due to the flooding, a condition may occur in which a lower inner part of the pipeline PL is filled with water and an upper inner part of the pipeline PL is filled with air. In this case, a standing wave having an interval m according to the sound velocity in water is generated in the part of the pipeline PL filled with water. In addition, in the portion of the pipeline PL filled with air, a standing wave having an interval m according to the sound velocity in air is generated. Therefore, in a case in which the optical fiber 1 is disposed at the part filled with water, a propagation characteristic (propagation speed) associated to the sound velocity in water is detected by the propagation characteristic detection unit 13, and it is determined by the flooding detection unit 14 that flooding has occurred. Meanwhile, in a case in which the optical fiber 1 is disposed at the part filled with air, a propagation characteristic (propagation speed) associated to the sound velocity in air is detected by the propagation characteristic detection unit 13, and it is determined by the flooding detection unit 14 that flooding has not occurred. Therefore, from a viewpoint of accurately detecting an occurrence of flooding, it is preferable that the optical fiber 1 is disposed at the inner lower part of the pipeline PL.

Next, a second specific example will be described with reference to FIGS. 8A and 8B. In the second specific example, whether flooding in the pipeline PL has occurred is detected, and a section where the flooding occurs is detected.

By distributed optical fiber sensing using the optical fiber 1, a temporal change in intensity of vibration at any point on the optical fiber 1 is detected. Herein, as described above, a sound propagating inside the pipeline PL is hardly attenuated. Thus, the temporal change in the intensity of vibration generated by the sound may be detected at two different points (specifically, at two different distances) and at two different points in time. In other words, the vibration generated by the sound may be detected at two different points (specifically, at two different distances) and at two different points in time.

Figure 8A:
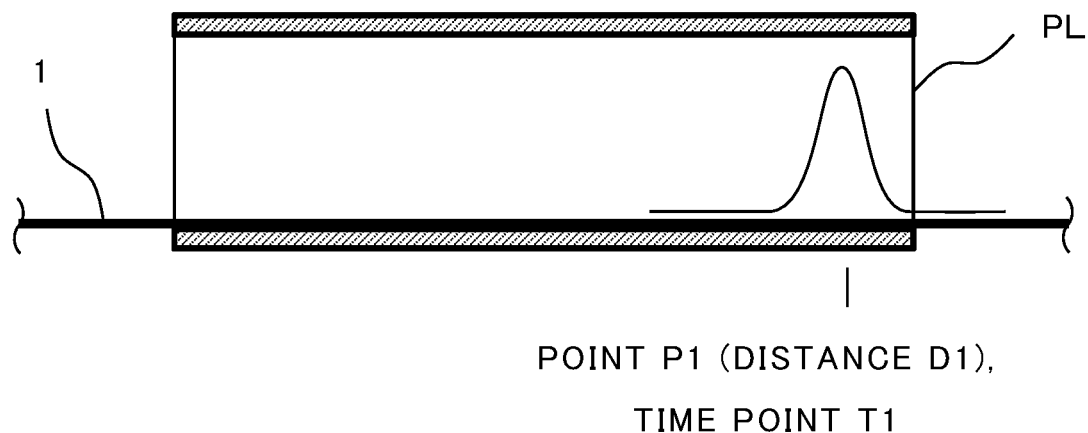
FIG. 8A is an explanatory diagram illustrating an example of a state in which vibration at a first point is detected at a first time.
Figure 8B:
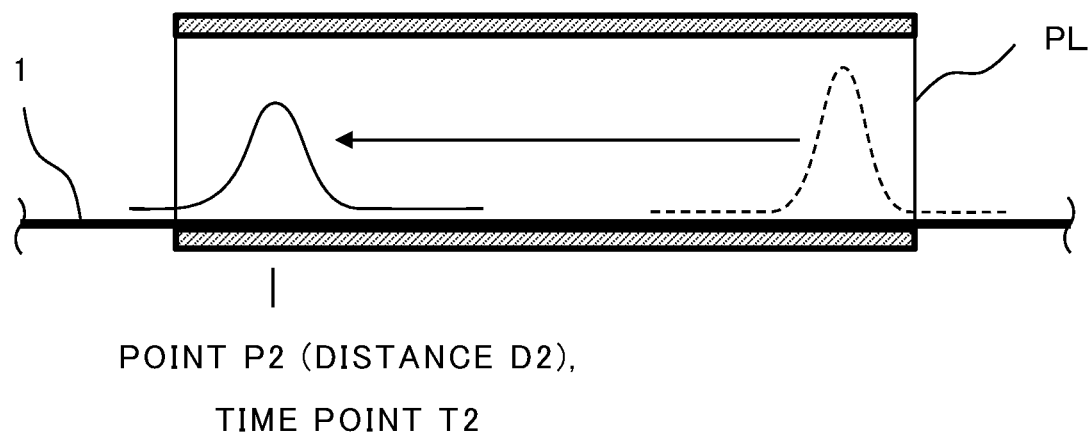
FIG. 8B is an explanatory diagram illustrating an example of a state in which vibration associated to the vibration illustrated in FIG. 8A at a second point is detected at a second time.

For example, as illustrated in FIG. 8A, it is assumed that vibration generated by a sound is detected at a predetermined point P1 (specifically, at a predetermined distance D1) and at a certain time point T1. Thereafter, it is assumed that the sound propagates inside the pipeline PL, and thereby, as illustrated in FIG. 8B, vibration associated to the sound is detected at another predetermined point P2 (specifically, at another predetermined distance D2) and at another time point T2. Hereinafter, the point P1 may be referred to as a "first point". Further, the point P2 may be referred to as "second point".

At this occasion, since each of the first point P1 and the second point P2 is a predetermined point, an interval ΔP between the first point P1 and the second point P2 is known. Further, the propagation characteristic detection unit 13 detects a time ΔT that is a time being taken for the vibration to propagate from the first point P1 to the second point P2, based on the difference between the first time point T1 and the second time point T2. The propagation characteristic detection unit 13 calculates a propagation speed V of the vibration in the pipeline PL by using the following Math (3).

$$V = \Delta P / \Delta T \qquad (3)$$

As described above, the propagation characteristic detection unit 13 detects a propagation speed of vibration in the pipeline PL as a propagation characteristic of the vibration in the pipeline PL. More specifically, the propagation characteristic detection unit 13 detects the propagation speed V of the vibration between the first point P1 and the second point P2. The propagation speed V corresponds to sound velocity inside the pipeline PL. More specifically, the propagation speed V corresponds to sound velocity between the first point P1 and the second point P2.

Therefore, based on the propagation speed V calculated by the propagation characteristic detection unit 13, the flooding detection unit 14 detects whether flooding in the pipeline PL has occurred, by using a similar method as that described in the first specific example. More specifically, the flooding detection unit 14 detects whether flooding in a section between the first point P1 and the second point P2 in the pipeline PL has occurred. Specifically, the flooding detection unit 14 determines whether the calculated propagation speed V is a value associated to the sound velocity in air or a value associated to the sound velocity in water. When the propagation speed V is a value associated to the sound velocity in air, the flooding detection unit 14 determines that flooding has not occurred. Meanwhile, when the propagation speed V is a value associated to the sound velocity in water, the flooding detection unit 14 determines that flooding has occurred.

Herein, in the pipeline PL, a plurality of different combinations (P1, P2) may be set as combinations (P1, P2) of the first point P1 and the second point P2. Specifically, for example, a plurality of combinations (P1, P2) associated to a plurality of sections arranged non-overlapping with each other may be set. The propagation characteristic detection unit 13 may calculate the propagation velocity V for each of the plurality of combinations (P1, P2). The flooding detection unit 14 may detect, for each of the plurality of combinations (P1, P2), whether flooding has occurred. Thus, flooding in each of the plurality of sections is detected. As a result, a section of the pipeline PL where flooding occurs is detected.

As described above, depending on the amount of water entering the pipeline PL due to flooding, a state may occur in which the inner lower part of the pipeline PL is filled with water and the inner upper part of the pipeline PL is filled with air. In this case, in the part of the pipeline PL filled with water, vibration propagates at the propagation speed V associated to the sound velocity in water. Further, in the of the pipeline PL filled with air, vibration propagates at the propagation speed V associated to the sound velocity in air. Therefore, in a case in which the optical fiber 1 is disposed at the part filled with water, a propagation characteristic (propagation speed) associated to the sound velocity in water is detected by the propagation characteristic detection unit 13, and it is determined by the flooding detection unit 14 that flooding has occurred. Meanwhile, in a case in which the optical fiber 1 is disposed at the part filled with air, a propagation characteristic (propagation speed) associated to the sound velocity in air is detected by the propagation characteristic detection unit 13, and determined by the flooding detection unit 14 that flooding has not occurred. Therefore, from the viewpoint of accurately detecting an occurrence of flooding, it is preferable that the optical fiber 1 is disposed at the inner lower part of the pipeline PL.

Next, an advantageous effect of using the flooding detection system 100 will be described.

As described above, by using the flooding detection system 100, flooding in the pipeline PL can be detected. In particular, by using an existing optical fiber (for example, an optical fiber for communication) as the optical fiber 1, it is possible to eliminate necessity of installing a dedicated device (for example, a dedicated optical fiber or a dedicated sensor) for detecting flooding inside the pipeline PL. As a result, it is possible to achieve the detection of flooding with a simple system configuration that does not require these devices.

Next, a modification example of the flooding detection system 100 will be described.

Disposition of the optical fiber 1 in the pipeline PL is not limited to the example illustrated in FIG. 1. The optical fiber 1 may be provided along the pipeline PL in such a state that the propagation characteristic detection unit 13 can detect a propagation characteristic and the flooding detection unit 14 can detect the flooding. For example, the optical fiber 1 may be provided in a spiral shape along the inner circumferential surface of the pipeline PL instead of being provided in a linear shape along the longitudinal direction of the pipeline PL. Further, for example, the optical fiber 1 may be provided at a position away from the inner circumferential surface of the pipeline PL. However, as described above, from the viewpoint of accurately detecting an occurrence of flooding, it is preferable that the optical fiber 1 is disposed at the inner lower part of the pipeline PL.

Next, with reference to FIG. 9, another modification example of the flooding detection system 100 will be described.

The optical fiber 1 may be provided along a plurality of pipelines PL instead of being provided along one pipeline PL. For example, as illustrated in FIG. 9, the optical fiber 1 may be provided along two pipelines PL_1 and PL_2.

In this case, the propagation characteristic detection unit 13 detects a propagation characteristic of vibration in each of the plurality of pipelines PL. A method for detecting the propagation characteristic in each of the plurality of pipelines PL is similar to the method for detecting a propagation characteristic in one pipeline PL. Further, the flooding detection unit 14 detects flooding in each of the plurality of pipelines PL, based on the detected propagation characteristic. A method for detecting flooding in each of the plurality of pipelines PL is similar to the method for detecting flooding in one pipeline PL.

It is preferable that the plurality of pipelines PL are acoustically separated from each other. Specifically, for example, in the example illustrated in FIG. 9, the pipelines PL_1 and PL_2 are provided independently of each other (that is, the pipelines PL_1 and PL_2 are not connected with each other), and thereby the pipelines PL_1 and PL_2 are acoustically separated from each other. Alternatively, for example, when the pipelines PL_1 and PL_2 are connected with each other, the pipelines PL_1 and PL_2 are acoustically separated from each other by a sound insulating material provided between the pipelines PL_1 and PL_2.

For example, a case is considered in which the first specific example is applied to the example illustrated in FIG. 9. In this case, an acoustic characteristic to be detected is an acoustic characteristic having both ends (A, B) of the pipeline PL_1 as reflection points and an acoustic characteristic having both ends (C, D) of the pipeline PL_2 as reflection points. However, when the pipelines PL_1 and PL_2 are not acoustically separated from each other, sound inside the pipeline PL_1 may propagate into inside of the pipeline PL_2. Similarly, sound inside the pipeline PL_2 may propagate into inside of the pipeline PL_1. As a result, standing waves may generated for combinations of the reflection points such as (A, C), (B, D), (B, C), and (A, D) in addition to combinations of the reflection points (A, B) and (C, D), and therefore there is a concern that the propagation of the sound wave becomes complicated. In other words, there is a concern that a standing wave to be detected may be masked by other standing waves. Meanwhile, since the pipelines PL_1 and PL_2 are acoustically separated from each other, this concern can be eliminated.

Next, a modification example of the flooding detection device 2 will be described with reference to FIG. 10. Further, another modification example of the flooding detection system 100 will be described with reference to FIG. 11.

Figure 10:
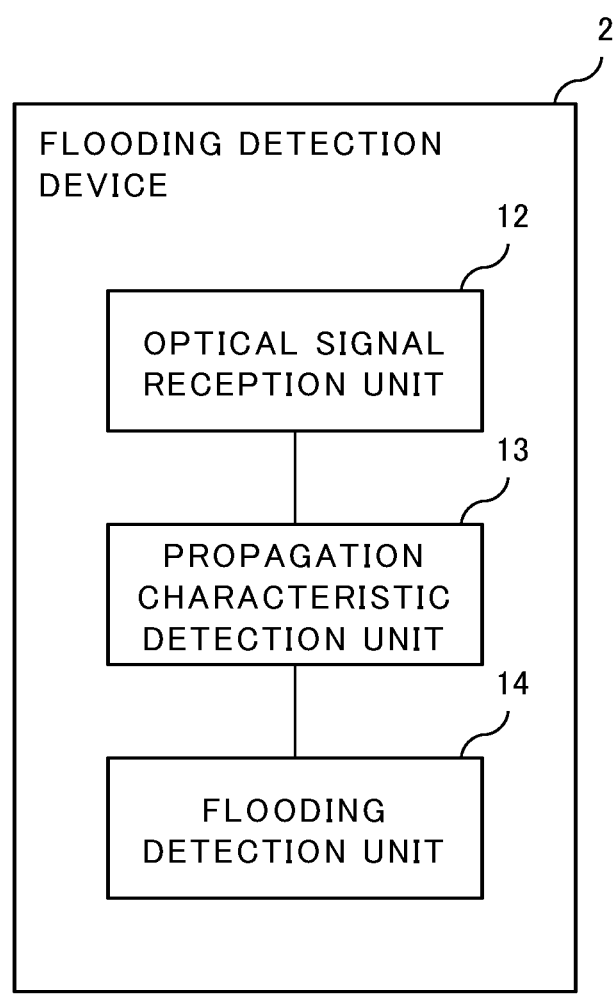
FIG. 10 is a block diagram illustrating a main part of another flooding detection device according to the first example embodiment.

As illustrated in FIG. 10, the optical signal reception unit 12, the propagation characteristic detection unit 13, and the flooding detection unit 14 may constitute the main part of the flooding detection device 2. In this case, the optical signal transmission unit 11 and the output control unit 15 may be provided outside the flooding detection device 2. In this case, when the optical fiber 1 is for communication, the optical signal transmission unit 11 may be provided in an optical communication device (not illustrated) using the optical fiber 1.

Figure 11:
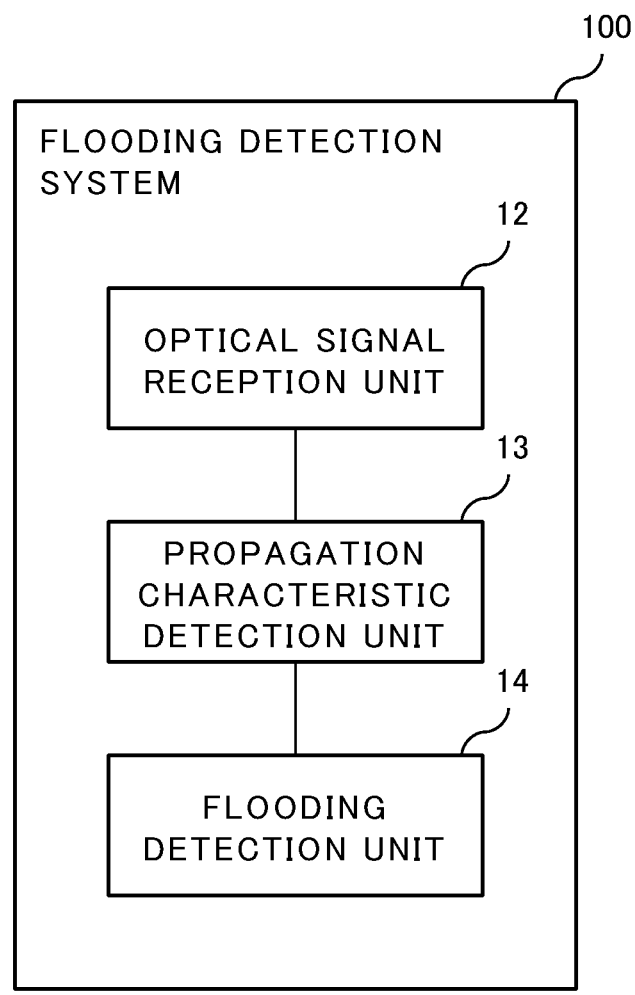
FIG. 11 is a block diagram illustrating a main part of another flooding detection system according to the first example embodiment.

As illustrated in FIG. 11, the optical signal reception unit 12, the propagation characteristic detection unit 13, and the flooding detection unit 14 may constitute the main part of the flooding detection system 100. In this case, the optical fiber 1 may be provided outside the flooding detection system 100. The optical signal transmission unit 11 and the output control unit 15 may be provided outside the flooding detection system 100. The output device 3 may be provided outside the flooding detection system 100. In this case, when the optical fiber 1 is for communication, the optical signal transmission unit 11 may be provided in an optical communication device (not illustrated) using the optical fiber 1.

Even in these cases, the above-described advantageous effect can be obtained. Specifically, the optical signal reception unit 12 receives an optical signal including sensing information, from the optical fiber 1 provided along the pipeline PL. The propagation characteristic detection unit 13 detects a propagation characteristic of vibration in the pipeline PL by using the sensing information included in the optical signal. The flooding detection unit 14 detects flooding in the pipeline PL, based on the propagation characteristic. Accordingly, it is possible to detect flooding in the pipeline PL. In particular, by using an existing optical fiber in the optical fiber 1, it is possible to eliminate necessity of installing a dedicated device for detecting flooding in the pipeline PL.

Note that, the flooding detection system 100 may include at least one of the optical signal transmission unit 11 and the output control unit (not illustrated) in addition to the optical signal reception unit 12, the propagation characteristic detection unit 13, and the flooding detection unit 14. Each component of the flooding detection system 100 may be configured of an independent device. These devices may be geographically distributed or networked in a distributed manner. For example, these devices may include edge computers and cloud computers.

While the invention has been particularly shown and described with reference to the exemplary embodiments thereof, the invention is not limited to these embodiments. It will be understood by those of ordinary skill in the art that various changes in form and details may be made therein without departing from the spirit and scope of the present invention as defined by the claims.

Some or all of the above-described example embodiments may be described as the following supplementary notes, but are not limited thereto.

[Supplementary Notes]

[Supplementary Note 1]

A flooding detection device including:
an optical signal reception means for receiving an optical signal including sensing information, from an optical fiber provided along a pipeline;
a propagation characteristic detection means for detecting a propagation characteristic of vibration in the pipeline by using the sensing information included in the optical signal; and
a flooding detection means for detecting flooding in the pipeline, based on the propagation characteristic.

[Supplementary Note 2]

The flooding detection device according to supplementary note 1, wherein
the sensing information includes a frequency intensity distribution of the vibration,
the propagation characteristic includes a propagation speed of the vibration, and
the propagation characteristic detection means detects a wavelength of a standing wave by detecting at least one of a node and an antinode of the standing wave associated to the vibration, based on the frequency intensity distribution, and detects the propagation speed, based on a frequency and the wavelength of the standing wave.

[Supplementary Note 3]

The flooding detection device according to supplementary note 1, wherein
the sensing information includes a temporal change in intensity of the vibration at a first point in the pipeline and a temporal change in intensity of the vibration at a second point in the pipeline,
the propagation characteristic includes a propagation speed of the vibration, and
the propagation characteristic detection means detects the propagation speed by detecting a time being taken for the vibration to propagate from the first point to the second point, by using the sensing information.

[Supplementary Note 4]

The flooding detection device according to supplementary 3, wherein the flooding detection means detects the flooding in a section between the first point and the second point of the pipeline.

[Supplementary Note 5]

The flooding detection device according to any one of supplementary notes 1 to 4, wherein a notification is output according to a result of detection by the flooding detection means.

[Supplementary Note 6]

A flooding detection system including:
an optical signal reception means for receiving an optical signal including sensing information, from an optical fiber provided along a pipeline;
a propagation characteristic detection means for detecting a propagation characteristic of vibration in the pipeline by using the sensing information included in the optical signal; and
a flooding detection unit for detecting flooding in the pipeline, based on the propagation characteristic.

[Supplementary Note 7]

The flooding detection system according to supplementary note 6, wherein
the sensing information includes a frequency intensity distribution of the vibration,
the propagation characteristic includes a propagation speed of the vibration, and
the propagation characteristic detection means detects a wavelength of a standing wave by detecting at least one of a node and an antinode of the standing wave associated to the vibration, based on the frequency intensity distribution, and detects the propagation speed, based on a frequency and the wavelength of the standing wave.

[Supplementary Note 8]

The flooding detection system according to supplementary note 6, wherein
the sensing information includes a temporal change in intensity of the vibration at a first point in the pipeline and a temporal change in intensity of the vibration at a second point in the pipeline,
the propagation characteristic includes a propagation speed of the vibration, and
the propagation characteristic detection means detects the propagation speed by detecting a time being taken for the vibration to propagate from the first point to the second point, by using the sensing information.

[Supplementary Note 9]

The flooding detection system according to supplementary note 8, wherein the flooding detection means detects the flooding in a section between the first point and the second point of the pipeline.

[Supplementary Note 10]

The flooding detection system according to any one of supplementary notes 6 to 9, wherein a notification is output according to a result of detection by the flooding detection means.

[Supplementary Note 11]
A flooding detection method including:
receiving, by an optical signal reception means, an optical signal including sensing information, from an optical fiber provided along a pipeline,
detecting, by a propagation characteristic detection means, a propagation characteristic of vibration in the pipeline by using the sensing information included in the optical signal, and
detecting, by a flooding detection means, flooding in the pipeline, based on the propagation characteristic.

[Supplementary Note 12]
The flooding detection method according to supplementary note 11, wherein
the sensing information includes a frequency intensity distribution of the vibration,
the propagation characteristic includes a propagation speed of the vibration, and
the propagation characteristic detection means detects a wavelength of a standing wave by detecting at least one of a node and an antinode of the standing wave associated to the vibration, based on the frequency intensity distribution, and detects the propagation speed, based on a frequency and the wavelength of the standing wave.

[Supplementary Note 13]
The flooding detection method according to supplementary note 11, wherein the sensing information includes a temporal change in intensity of the vibration at a first point in the pipeline and a temporal change in intensity of the vibration at a second point in the pipeline,
the propagation characteristic includes a propagation speed of the vibration, and
the propagation characteristic detection means detects the propagation speed by detecting a time being taken for the vibration to propagate from the first point to the second point, by using the sensing information.

[Supplementary Note 14]
The flooding detection method according to supplementary note 13, further including detecting, by the flooding detection means, the flooding in a section between the first point and the second point of the pipeline.

[Supplementary Note 15]
The flooding detection method according to any one of supplementary notes 11 to 14, further including outputting a notification, according to a result of detection by the flooding detection means.

[Supplementary Note 16]
A recording medium recording a program causing a computer to function as:
an optical signal reception means for receiving an optical signal including sensing information, from an optical fiber provided along a pipeline;
a propagation characteristic detection means for detecting a propagation characteristic of vibration in the pipeline by using the sensing information included in the optical signal; and
a flooding detection means for detecting flooding in the pipeline, based on the propagation characteristic.

[Supplementary Note 17]
The recording medium according to supplementary note 16, wherein
the sensing information includes a frequency intensity distribution of the vibration,
the propagation characteristic includes a propagation speed of the vibration, and
the propagation characteristic detection means detects a wavelength of a standing wave by detecting at least one of a node and an antinode of the standing wave associated to the vibration, based on the frequency intensity distribution, and detects the propagation speed, based on a frequency and the wavelength of the standing wave.

[Supplementary Note 18]
The recording medium according to supplementary note 16, wherein
the sensing information includes a temporal change in intensity of the vibration at a first point in the pipeline and a temporal change in intensity of the vibration at a second point in the pipeline,
the propagation characteristic includes a propagation speed of the vibration, and
the propagation characteristic detection means detects the propagation speed by detecting a time being taken for the vibration to propagate from the first point to the second point, by using the sensing information.

[Supplementary Note 19]
The recording medium according to supplementary note 18, wherein the flooding detection means detects the flooding in a section between the first point and the second point of the pipeline.

[Supplementary Note 20]
The recording medium according to any one of supplementary notes 16 to 19, wherein the program further causes the computer to function as an output control means for executing control for outputting a notification according to a result of detection by the flooding detection means.

REFERENCE SIGNS LIST

1 Optical fiber
2 Flooding detection device
3 Output device
11 Optical signal transmission unit
12 Optical signal reception unit
13 Propagation characteristic detection unit
14 Flooding detection unit
15 Output control unit
16 Optical signal transmission/reception unit
21 Computer
31 Transmitter
32 Receiver
33 Processor
34 Memory
35 Processing circuit

What is claimed is:
1. A flooding detection device comprising:
at least one memory configured to store instructions; and
at least one processor configured to execute the instructions to:
detect a propagation characteristic of vibration in a pipeline based on sensing information included in an optical signal from an optical fiber provided along the pipeline; and
detect flooding in the pipeline based on the propagation characteristic,
wherein the sensing information includes a frequency intensity distribution of the vibration,
wherein the frequency intensity distribution is an intensity distribution for each frequency component,
wherein the propagation characteristic includes a propagation speed of the vibration, and wherein the at least one processor is further configured to execute the instructions to:
  select a frequency at which a standing wave associated with the vibration is generated based on the frequency intensity distribution,
  detect a wavelength of the standing wave associated with the selected frequency by detecting at least one of a node and an antinode of the standing wave, and
  detect the propagation speed based on the frequency and the wavelength of the standing wave.

2. The flooding detection device according to claim 1, wherein the at least one processor is further configured to execute the instructions to:
  detect the propagation speed for each of a plurality of different frequencies at which standing waves are generated, and
  based on standing waves being generated at the plurality of different frequencies, obtain a statistical value based on the detected propagation speeds.

3. The flooding detection device according to claim 2, wherein the at least one processor is further configured to output a notification according to a result of detection of flooding in the pipeline.

4. The flooding detection device according to claim 1, wherein the at least one processor is further configured to execute the instructions to output a notification according to a result of detection of flooding in the pipeline.

5. A flooding detection system comprising:
  an optical signal reception unit configured to receive an optical signal including sensing information, from an optical fiber provided along a pipeline;
  at least one memory configured to store instructions; and
  at least one processor configured to execute the instructions to:
    detect a propagation characteristic of vibration in the pipeline by using the sensing information included in the optical signal; and
    detect flooding in the pipeline, based on the propagation characteristic,
  wherein the sensing information includes a frequency intensity distribution of the vibration,
  wherein the frequency intensity distribution is an intensity distribution for each frequency component,
  wherein the propagation characteristic includes a propagation speed of the vibration, and
  wherein the at least one processor is further configured to execute the instructions to:
    select a frequency at which a standing wave associated with the vibration is generated based on the frequency intensity distribution, and
    detect a wavelength of the standing wave associated with the selected frequency by detecting at least one of a node and an antinode of the standing wave, and
    detect the propagation speed based on the frequency and the wavelength of the standing wave.

6. The flooding detection system according to claim 5, wherein the at least one processor is further configured to execute the instructions to:
  detect the propagation speed for each of a plurality of different frequencies at which standing waves are generated, and
  based on standing waves being generated at the plurality of different frequencies, obtain a statistical value based on the detected propagation speeds.

7. The flooding detection system according to claim 6, wherein the at least one processor is further configured to execute the instructions to output a notification according to a result of detection of flooding in the pipeline.

8. The flooding detection system according to claim 5, wherein the at least one processor is further configured to execute the instructions to output a notification according to a result of detection of flooding in the pipeline.

9. A flooding detection method comprising:
  receiving, by an optical signal reception unit, an optical signal including sensing information, from an optical fiber provided along a pipeline;
  detecting, by at least one processor configured to execute instructions stored in at least one memory, a propagation characteristic of vibration in the pipeline by using the sensing information included in the optical signal; and
  detecting, by the at least one processor, flooding in the pipeline, based on the propagation characteristic,
  wherein the sensing information includes a frequency intensity distribution of the vibration,
  wherein the frequency intensity distribution is an intensity distribution for each frequency component,
  wherein the propagation characteristic includes a propagation speed of the vibration, and
  wherein the method further comprises:
    selecting a frequency at which a standing wave associated with the vibration is generated based on the frequency intensity distribution,
    detecting a wavelength of the standing wave associated with the selected frequency by detecting at least one of a node and an antinode of the standing wave, and
    detecting the propagation speed based on the frequency and the wavelength of the standing wave.

10. The flooding detection method according to claim 9, further comprising:
  detecting, by the at least one processor, the propagation speed for each of a plurality of different frequencies at which standing waves are generated; and
  based on standing waves being generated at the plurality of different frequencies, obtaining a statistical value based on the detected propagation speeds.

11. The flooding detection method according to claim 10, further comprising outputting, by the at least one processor, a notification according to a result of the detecting flooding in the pipeline.

12. The flooding detection method according to claim 9, further comprising outputting, by the at least one processor, a notification according to a result of the detecting flooding in the pipeline.

\* \* \* \* \*